United States Patent [19]

Ku

[11] 4,321,646

[45] Mar. 23, 1982

[54] VOLTAGE DISCONNECT AND SUPPLEMENTAL HEATER DEVICE

[76] Inventor: Paul H. Ku, 47-50 59th St., Apt. 2H, Woodside, N.Y. 11377

[21] Appl. No.: 122,277

[22] Filed: Feb. 19, 1980

Related U.S. Application Data

[63] Continuation of Ser. No. 952,292, Oct. 18, 1978, abandoned.

[51] Int. Cl.³ .............................................. H02H 3/24
[52] U.S. Cl. .................. 361/92; 307/10 BP; 361/187
[58] Field of Search .................. 307/10 BP; 219/202, 219/279; 320/40; 361/92, 187

[56] References Cited

U.S. PATENT DOCUMENTS 4,082,992  4/1978  Day .......................... 307/10 B P X

FOREIGN PATENT DOCUMENTS 2313428  9/1974  Fed. Rep. of Germany ...... 219/202
1255965 12/1971  United Kingdom ................ 219/202

*Primary Examiner*—Harry E. Moose, Jr.

[57] ABSTRACT

In a preferred embodiment, designed for gas-efficient automobiles having low power alternators having insufficient power and utilizing a battery of insufficient voltage to operate both the automobile necessary circuitry and heater as to heat the automobile space within a satisfactory short time interval of a few minutes, a circuitry of conventional type but additionally including in series with a low voltage relay, another voltage relay switch which when energized turns on current to an electromagnetic relay normally open switch to close the switch to thereby connect a second battery positive terminal to the output terminal of the alternator for thereby recharging the second battery, and the normally open switch normally connecting the positive terminal of the second battery to a large supplemental heater when the normally open switch is in an open state, whereby when the regular low capacity battery is at low voltage the supplemental heater quickly heats the automobile space, and at elevated voltage the conventional heater takes-over while the alternator serves to recharge the second battery over a prolonged period of time.

6 Claims, 1 Drawing Figure

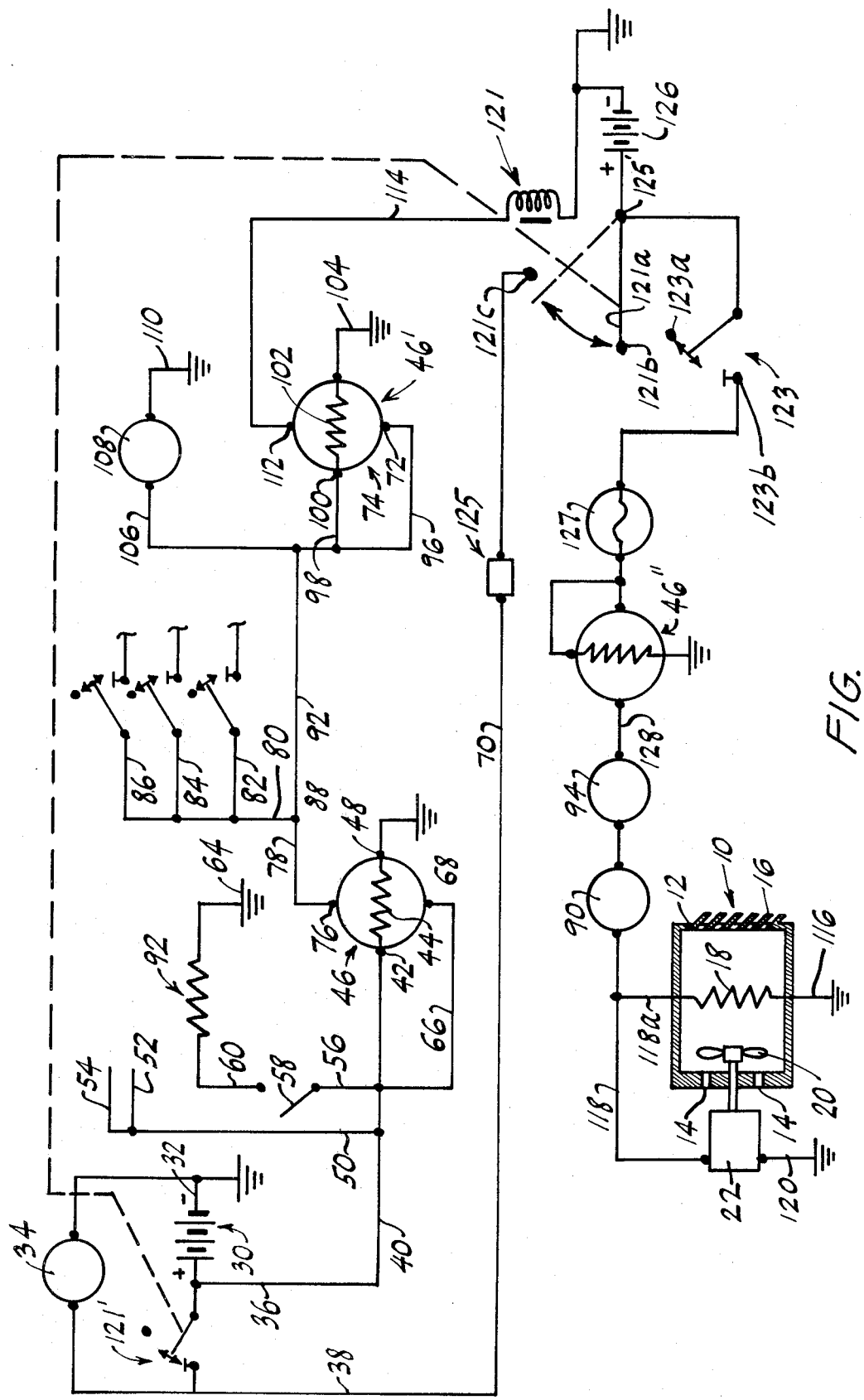

VOLTAGE DISCONNECT AND SUPPLEMENTAL HEATER DEVICE

This invention relates to an electrical system and heating device for vehicles, more particularly for small cars having high gas efficiency. This is a continuation in part of U.S. Ser. No. 952,292 filed Oct. 18, 1978, now abandoned.

BACKGROUND TO THE INVENTION

Automobiles particularly ones of small size, in order to achieve optimal high gas milage must and do utilize small alternators and low capacity battery. A difficulty with such small alternator and battery is that there is insufficient electrical power to quickly heat the automobile with the electrical heater. Accordingly there is no apparent way heretofore to utilize a supplemental electrical heater either with or without an auxilliary battery since such small alternator often would prove to cause excessively low voltage when recharging the auxilliary battery.

Typically, for requisite quick heating of automobile space, an electrical heater of 3600 watts is needed if the auto passenger space is to be heated within about two to four minutes, for example. For a full-sized low gas-efficient automobile, the alternator or generator is normally about 100 amperes; when accelerating from an original 1500 RPM to about 4500 RPM, the large alternator or generator will increase from typically (100×12) 1200 watts energy to 3600 watts energy. This is sufficient power to quickly heat a car passenger space by use of such a 3600 watt electrical heater. On the other hand, alternator amperage for gas-efficient small cars is about 35 amperes; acceleration from about 1500 RPM to 3,000 RPM will double the amperes from 35 to 70 amperes, which for a 12 volt battery increases wattage from 420 watts to 840 watts, far short of the 3600 watts needed for a 3600 watt electrical heater. Even if the acceleration were tripled from 1500 to 4500 RPM (revolutions per minute), the resulting wattage would be a mere 1260 watts, hardly one-third of needed energy for a 3600 watt electrical heater. An electrical heater of lower wattage would be insufficient to accomplish the needed result of heating automobile passenger space within typically three minutes or less.

It should be noted, as general information, that voltage of batteries for large and small automobiles is substantially the same, ranging typically from about 10.5 volts to about 13 volts.

BROAD DESCRIPTION OF THE INVENTION

While the present invention can be utilized in both large and small automobiles, the primary utility of the invention lies with its use in small automobiles as above-characterized in the background discussion.

Accordingly, objects of the present invention include the achieving of the new result of being able to quickly heat-up the passenger space of a high gasoline-efficient automobile normally characterized as a small automobile such as would typically have low power batteries and low power alternators incapable of utilizing high power electrical heaters such as 3600 watt electrical heaters, prior to the present invention. It should be noted in this regard that high gasoline efficiency of the small cars cannot be achieved if and when the larger generators or alternators are utilized of the types characteristic of the large standard cars.

Another object is to achieve a novel circuitry and element combination enabling selected intermittent charging of the supplementary battery at times not interfering with the normal operation of the small automobile with its lower power battery and low power alternator, particularly in times of peak demand by other automobile accessories.

Another object is to achieve automatic operation of a supplementary electrical heating system in a manner which does not overtax or deplete detrimentally the power of a supplementary battery.

Another object is to achieve a supplementary electrical quick-heating system operative devoid of running of the motor or closed circuitry of the main switch of an automobile, and not interfering with normal automobile circuitry operation either when in use or when not in use.

Other objects become apparent from the preceding and following disclosure.

One or more of the objects are obtained by the invention as illustrated in the Figure which is intended solely to improve an understanding of the invention but not to unduly limit the scope thereof.

Broadly the invention is directed to a combination having its principal utility in gasoline high-efficiency small automobiles having both low power batteries and low power alternators as discussed-above. The invention combination makes possible the normal circuitry operation with the conventional primary automobile battery and circuitry always directed to solely driving the conventional circuitry and accessory electrical elements thereof, devoid of supplementary drain on the primary battery, but concurrently makes possible the immediate and fast-heating of the automobile by a high-powered battery which operates only when required within the desired predetermined and preset ambient temperature range with manual control to activate and deactivate; solely when the primary automobile battery is adequately charged to have a voltage above a predetermined and set lower limit, will the relay switch of this invention become activated to thereby utilize the automobile alternator during engine operation while concurrently disconnecting the primary automobile battery until such time that a detected low voltage or excessive current-demand of normal automobile accessories causes the primary battery to become reconnected to the alternator for recharging thereof and for the alternator to assist in the providing of electrical power for normal automobile operation. At no time is the alternator connected simultaneously to both the primary automobile battery and the supplementary battery, and at no time does the primary automobile battery assist in the driving or energizing the supplementary electrical heater, and at no time does the supplementary battery provide electrical energy to other automobile functions. These benefits are accomplished by the fact that the recharging of the supplementary battery is achieved solely when the electromagnetic switch is activated, and that activation takes place solely when the electrical power in the primary automobile accessory circuitry is sufficiently high as to provide a margin of safety and reserve energy above the current demand of automobile electrical accessories and well-above the danger level of low voltage of the primary battery for which a separate voltage control is included to earlier turn-off non-essential electrical accessories. Accordingly, the normal operation and required electrical battery power reserve of the primary automobile battery and the timely recharging thereof is totally protected, while concurrently prompt and fast heating of the automobile space is achieved, and by virtue of the selective non-detrimental recharging at convenient time not interfering with normal automobile functions and operations, the fast-heating operation and function is normally always readily available for use when needed.

More particularly, the supplemental battery is of a type suitable to provide at-least about 3600 watts over a period of at least about two minutes.

There is preferably a manual control for turning on and off the circuitry between the supplementary battery and the supplemental electric heating unit, in addition to a preferred thermostatic control of one or more thermostatic switches for turning on at preset low temperature point and turning-off at preset high temperature point at opposite ends of an ambient temperature range as might be desired.

Preferably the heater unit is an electrical unit of about 3690 watts-demand.

Preferably the primary automobile circuitry includes a low power circuitry of the type produceable of about 35 amperes at about 1500 revolutions-per-minute.

The basic combination includes an electrical direct current battery circuitry which includes a primary battery and primary battery positive terminal thereof. There are included as a part thereof, circuitry leads which provide electrical power to the conventional combustion engine electrical elements and normal conventional accessory electrical elements of an automobile. The circuitry leads to accessory electrical elements include a first power lead mechanism; it includes a low voltage relay connected to break series circuitry powering accessory electrical elements at a predetermined and preset low voltage as might be desired as a low limit, and to re-establish series circuitry at voltage at a preset point above the preset low voltage disconnect point. The first power lead mechanism further includes a power input low voltage input lead to the low voltage relay, and a power output low voltage relay lead connected to power accessory elements. Also the accessory electrical leads include an accessory battery and battery-heater output lead connecting the accessory supplementary battery to the supplemental electrical heater. There is also present, as a part of the basic combination, a supplementary electrical heating system. It includes a direct current electrical heater unit and a supplementary battery providing at least about 3600 watts over a period of at least about two minutes, in its reserve power potential. Also there is included, as a part of the heating system unit, a battery regulator to prevent overcharge of the supplementary battery and to avoid potential feed-back; also there is the main electromagnetic switch noted previously, powered through a high-limit voltage control switch and when closed connected to close circuitry between the alternator and the positive terminal of the supplementary battery while concurrently to open circuitry by virtue of a double-throw switch, or its equivalent, to simultaneously break circuitry between the alternator and the primary automobile battery's positive terminal without disconnecting the primary automobile battery from its conventional automobile circuitry and accessory circuitry. The preferred manual control off and on activation switch for the supplementary electrical heater, is connected between the supplementary electrical heater and the positive pole of the supplementary battery, in series with preferably the above-noted thermostatic off-on switches. Also preferably in this direct-control lead between the supplementary battery and the supplementary electrical heater, is another low voltage switch to avoid drawing-down too much power from the supplementary battery, whereby the heater is turned-off prior to such point, to avoid battery damage.

While the battery voltage in the 12 volt battery vehicle electrical system is commonly referred to as 12 volt, the voltage in such systems will bary from about 10 volts when the battery has been discharged. Thus, such results by prolonged or repeated starting, for example, in cold weather; upward to about 14.5 volts, the battery may have a higher voltage, depending upon the regulator setting, such occurring possibly as a result of engine acceleration to high acceleration. When the battery has been discharged, such as to 10 volts, recharging of the battery and restoration of the system to 12 volts is of paramount importance. It is to this aspect that this invention also applies, in addition to the above matters previously discussed. When the battery is fully or substantially charged and the system voltage increases to, for example 14.5 volts, there is excess voltage within the system. It is then that the electromagnetic switch will be activated such that the supplementary battery recharging will be initiated while concurrently disconnecting the primary automobile battery from the charging alternator.

It should be further noted that when the alternator is connected to the recharge circuitry of the supplementary battery, it is concurrently also connected to the supplementary heater powering circuitry for facilitating the heating of the automobile if the automobile engine is running, so long as the circuitry is closed both manually and by the thermostatic controls.

Accordingly, when the automobile is in use, the manual switch may be kept in the "on" state at all times; accordingly, it is contemplated that the manual control switch optionally can be controlled by the automobile switch key, to be turned-On and off along with the conventional ignition.

The invention can be better understood by making reference to the accompanying FIGURE.

THE FIGURE

The FIGURE illustrates in-part an automobile circuitry in so far as such relates to the present invention, and embodies graphically and diagrammatically the inventive improvements making up the novel combination and advantages thereof set-forth in the objects.

DETAILED DESCRIPTION OF THE INVENTION

In the FIGURE, it will be seen that there is a conventional low-powered battery typical of those utilized in small and gas-efficient automobiles, as a twelve volt battery typically. It is shown as battery 30 connected to 32 to ground and to one side of the alternator 34 (output side of the alternator) through the double-throw-component switch 121' of the switch 121. At the other side of the double throw-component switch 121', on the battery side (battery 30) the positive battery terminal is connected to further circuitry 40 and leads therefrom. Lead 40 is connected to necessary electrical-demand elements and to the low voltage control switch 46, connected at the control switch input terminal 42 and the power switch input terminal 44, in conventional connection manner. When voltage is sufficiently high, power output terminal 76 provides power to unnecessary or non-essential accessories of lead 78 and subsequent leads 92, 106, 98, 96, with conventional connections as above described for the other voltage control switch, as shown connected to the next higher-set voltage control switch 46'. Switch 46' when closed furnishes power to the electrical relay switch 121 above-noted.

Typically the leads 52 and 54 are to essential elements such as lights and horn, respectively. Leads 56 and 58 and resistor and ground and gate 58 are representative of the ignition system. Lead 80 and leads 82, 84 and 86 and switches thereof are representative of heater (conventional low-powered), heater fan, radio respectively, for example. Voltemeter 108 of lead 106 and ground 110 are likewise non-essential accessories. If these non-essential accessories draw-down the voltage below the higher-preset level of low voltage switch 46', then the switch breaks (opens) the power circuit whereby the gate 121a swings to the open position as its normally-open state, to terminal 121b.

When the electromagnetic switch 121 is activated and closes, the alternator becomes disconnected from the primary car battery 30 and becomes thereby concurrently connected through lead 70 to the power input terminal 121c through closed gate 121a, by way of the voltage control element 125, to the switch terminal 125 which is connected to the positive terminal of the supplementary battery 126; likewise, through manual switch 123 when closed, the supplementary battery 126 and/or the alternator 34 each is connected to the supplementary heating unit 10, the alternator being connected only when the switch 121 is in an activated state, by power through lead 114, from power terminal 112 of switch 46'.

Fuse 127 is a mere conventional safety feature. The power lead 118 is in series with power lead 128 which draws power from the switch terminal 123b when the gate 123a is closed of switch 123, and in series within the power lead 128 are the low voltage switch 46" operatively connected in conventional manner as shown and previously described for switch 46. Likewise, the thermostatic switches 90 and 94 are in series in lead 128, and may be separate thermostatic switches as shown or alternatively may be a conventionally combined thermostatic switches serving combined functions. Lead 118a leads to the heater coils 18. The heater unit 10 has other conventional elements such as the ground lead 116, the fan blade 20, the heater casing 14, the hot-air deflectors 16, of the casing front 12, and the motor 22 and its ground wire or lead 120.

As illustrated, the supplementary battery is one of greater power than the conventional battery 30.

Accordingly, by the preceding invention as described, the objects are achieved.

It is within the scope of the invention to make such variations and substitution of equivalents as would be apparent to a person of ordinary skill in this technology.

I claim:

1. A combination engine vehicle and electrical heater circuit device, comprising in combination: (1) an electrical direct current battery circuitry including a primary battery and primary battery positive terminal thereof, and including circuitry leads providable of electrical power to a combustion engine electrical elements and to accessory electrical elements, in which the circuitry leads leading to accessory electrical elements include a first power lead means comprising a low voltage relay connected to break series circuitry powering accessory electrical elements at a predetermined low voltage and to re-establish series circuitry at voltage above said predetermined low voltage, the first power lead means further including a power input low voltage input lead to said low voltage relay and a power output low voltage relay lead connectable to power accessory electrical elements, and said accessory electrical leads further including an accessory battery providable of wattage of at-least about 3600 watts over a period of at least about two minutes, and battery heater output lead connectable of the accessory battery to a supplemental electrical heater; and (2) a supplementary electrical heating system comprising a direct current electrical heater unit connectable to said accessory battery, and an electromagnetic relay normally-open switch, and first and second low voltage relays, and supplementary circuitry, said supplementary circuitry including a first low voltage relay output lead connected between a power output terminal of said first low voltage relay and a power input terminal of said electromagnetic relay normally-open switch, and an electromagnetic relay ground lead connecting an output terminal of said electromagnetic relay normally open switch to ground, and a closed-switch output terminal of said electromagnetic relay normally-open switch being connected by a first accessory battery lead to a positive terminal of said accessory battery, and a negative terminal of said accessory battery being connected to ground, and said positive terminal of said accessory battery being connected to a power input terminal of said direct current electrical heater unit having its heater unit output terminal connected to ground, and said second low voltage relay being connected in series with a supplementary heater lead between and connecting said power input terminal of said direct current electrical heater unit and said positive terminal of said accessory battery such that its circuit becomes broken at a predetermined low voltage of electric current to said direct current electrical heater unit such that low voltage of the accessory battery of a degree that would damage the accessory battery is thereby avoided, said electromagnetic relay normally-open switch having a closed-switch power input terminal connected to said accessory battery and heater lead, and a power input terminal of said first low voltage relay output lead being connected to said accessory battery by said accessory battery and heater lead, and a switch-control power-input terminal of said first low voltage relay being connected to said power output low voltage relay lead, and said first low voltage relay being of a type set at a higher low voltage activation point for breaking the power circuit than said predetermined low voltage, said electromagnetic relay normally-open switch being a double-throw switch having a primary battery's positive terminal-to-alternator lead-switch means for alternately breaking and making circuit between said primary battery positive pole and an alternator output terminal when said electromagnetic normally-open switch alternatively opens and closes.

2. A combustion engine vehicle and electrical heater circuit device of claim 1, including a normally-open manual switch connected between said positive terminal of said accessory battery and said power input terminal of said direct current electrical heater unit, adapted for turning on and off said supplementary heater.

3. A combustion engine vehicle and electrical heater circuit device of claim 1, including a thermostatic means for making and breaking circuit of said supplementary heater lead to said supplementary heater, to turn-on at a predetermined cool temperature and to turn-off at a predetermined hot temperature at opposite ends of an ambient temperature range of operation.

4. A combustion engine vehicle and electrical heater circuit device of claim 1, in which said direct current electrical heater unit is a heater of about 3690 watts.

5. A combustion engine vehicle and electrical heater circuit device of claim 4, including an alternator produceable of about 35 amperes at about 1500 revolutions-per-minute, as a part of said electrical direct current battery circuitry.

6. A combustion engine vehicle and electrical heater circuit device of claim 1, including an alternator produceable of about 35 amperes at about 1500 revolutions-per-minute, as a part of said electrical direct current battery circuitry.

* * * * *